Figure 20:
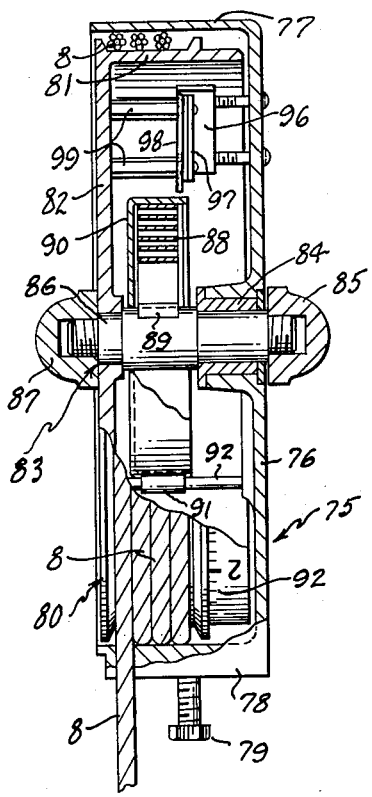

Dec. 5, 1961  G. T. RILEY  3,011,261
BOOM SPOT INDICATOR
Filed Jan. 31, 1958  5 Sheets-Sheet 1
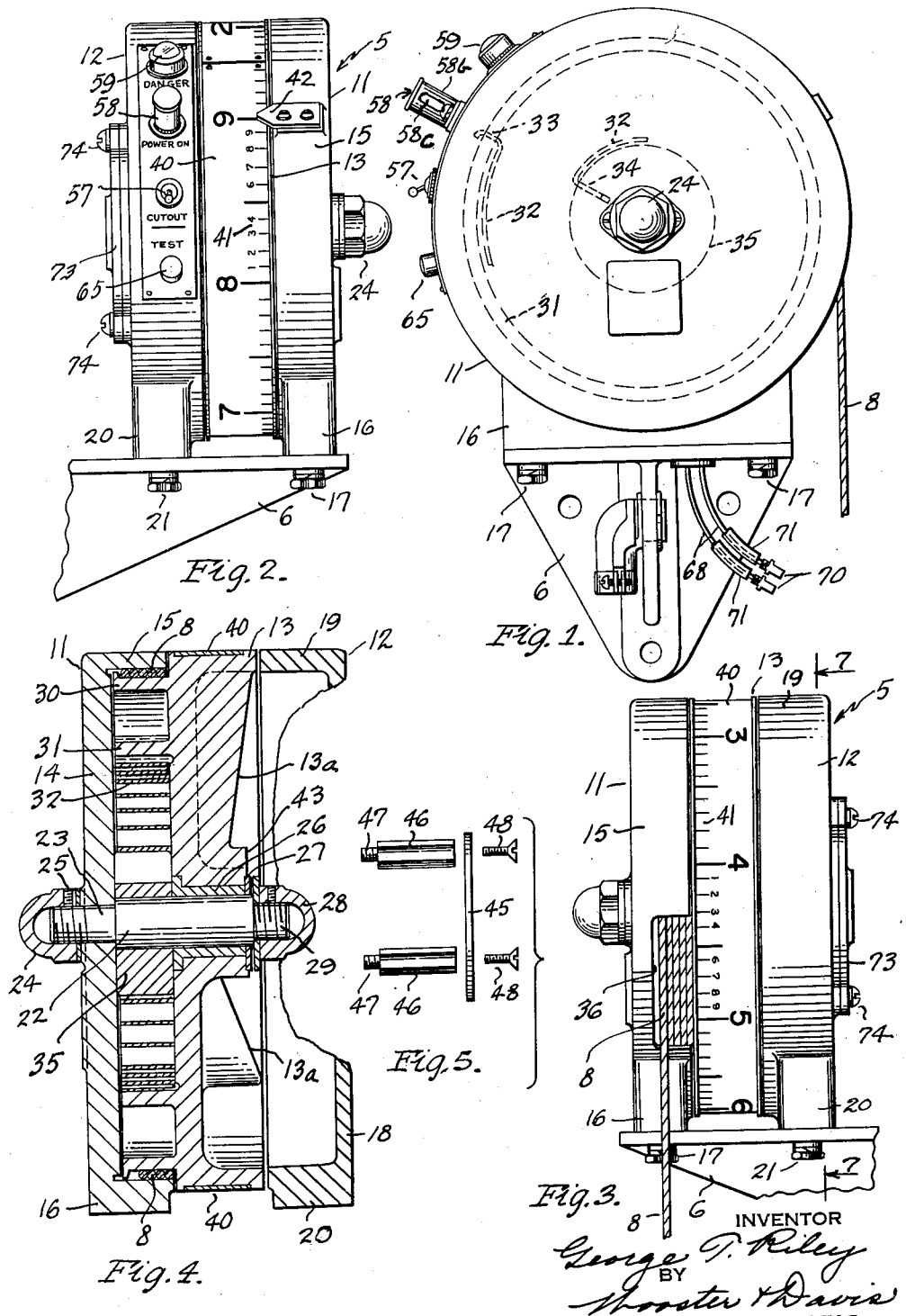

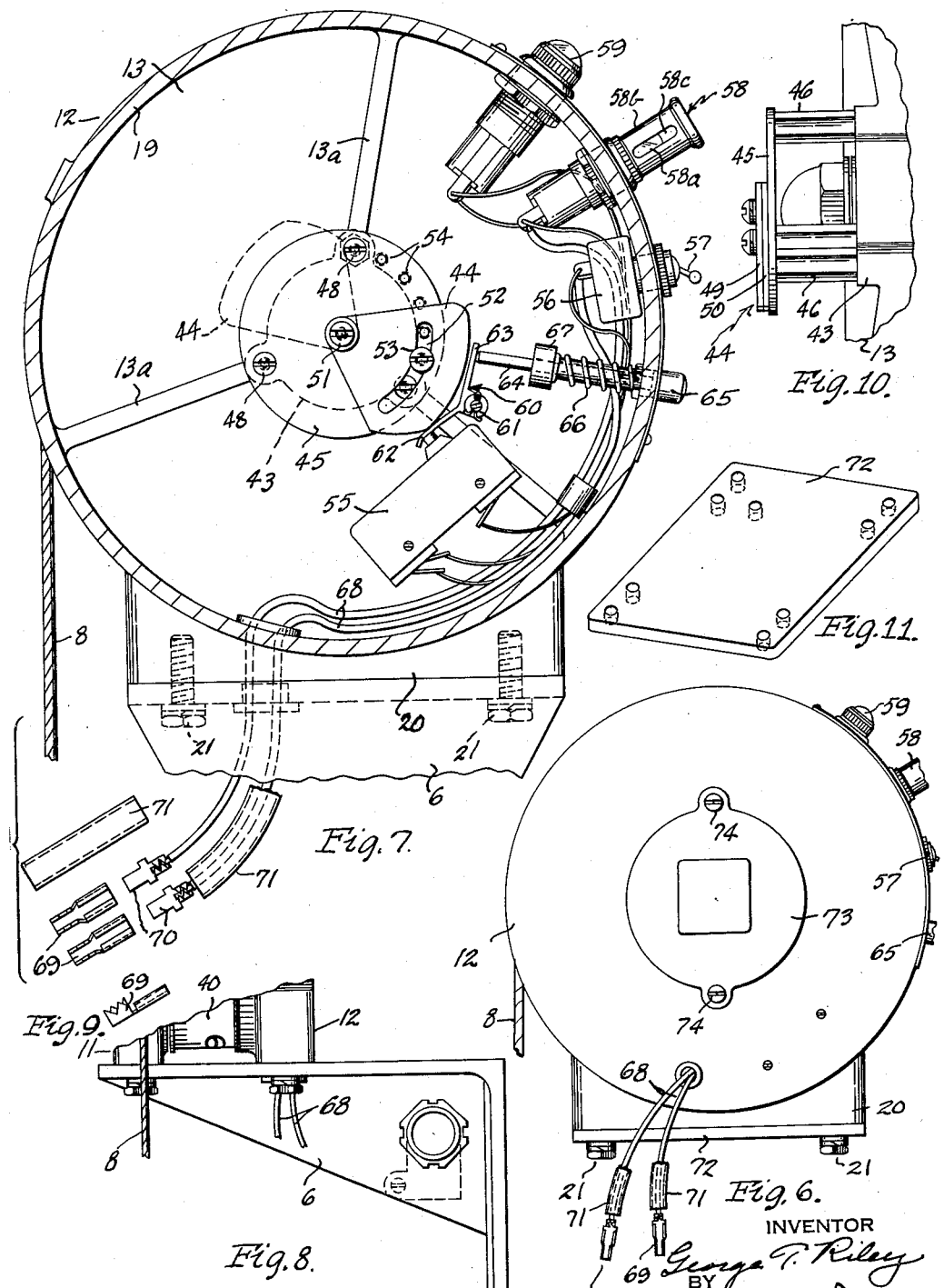

Dec. 5, 1961  G. T. RILEY  3,011,261
BOOM SPOT INDICATOR
Filed Jan. 31, 1958  5 Sheets-Sheet 3
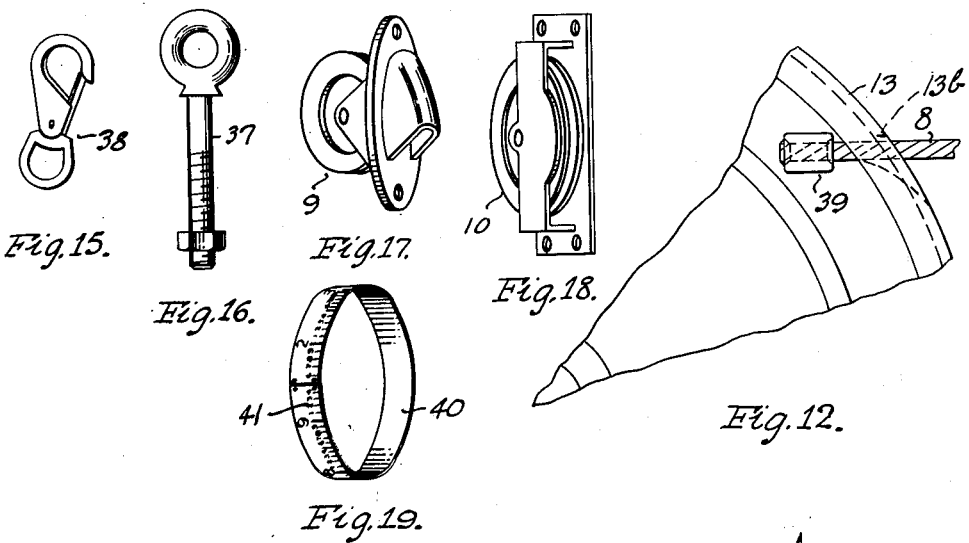
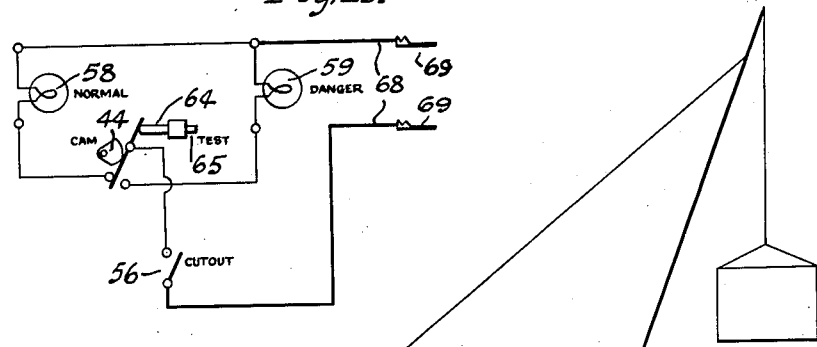
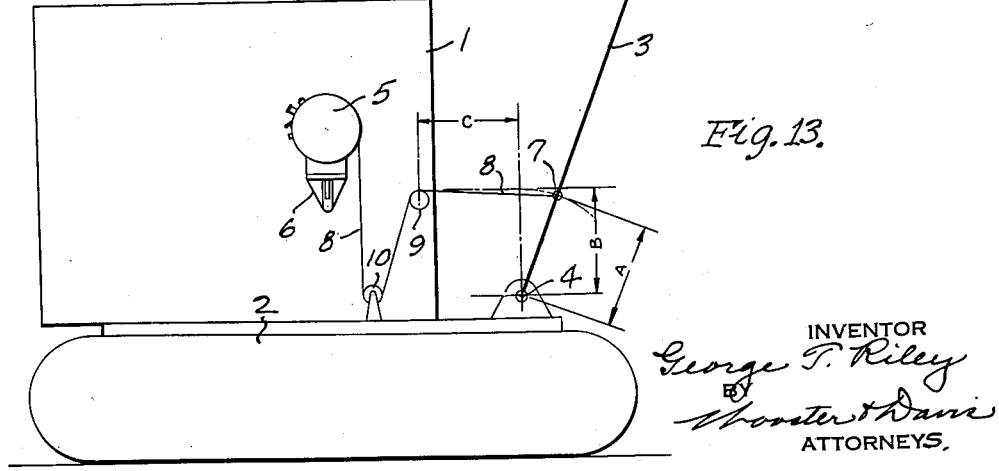
INVENTOR
George T. Riley
BY
Wooster + Davis
ATTORNEYS.

Dec. 5, 1961 G. T. RILEY 3,011,261
BOOM SPOT INDICATOR
Filed Jan. 31, 1958 5 Sheets-Sheet 4

INVENTOR
George T. Riley
BY
Wooster & Davis
ATTORNEYS.

United States Patent Office 3,011,261
Patented Dec. 5, 1961

3,011,261
BOOM SPOT INDICATOR
George T. Riley, Pound Road, Westerly, R.I.
Filed Jan. 31, 1958, Ser. No. 712,438
2 Claims. (Cl. 33—125)

This invention relates to a boom spot indicator and has for its principal object a means for visually indicating the elevation of the boom of any boom-rigged equipment relative to a reference plane. Examples of such equipment are boom rigged cranes, shovels, draglines, scrap loading cranes and other similar equipment for either industrial or construction uses.

Another object is to provide a device of this character in which the boom spot indicator may be mounted either in the cab of the equipment or at the control location in such position that an indicating scale forming a part of the instrument is readily visible to the operator of the equipment and is so connected that it will indicate to the operator angle of the boom relative to the horizontal or any desired reference plane and will also provide means to give a warning signal if the boom is raised or lowered to a predetermined maximum or minimum safe elevation during the course of operations.

It is well known that one of the major hazards in the heavy construction industry is the possibility that boom rigged equipment can be tipped over if the boom carrying a heavy load is either raised or lowered beyond the safe operating point wherein the leverage of the load becomes so great as to over-balance the weight of the equipment and cause it to tip over, frequently with loss of life or serious injury to the operator or other workmen in the vicinity. In addition to this, there is a grave financial loss incurred whenever such expensive equipment is incapacitated.

Many of the operations involving boom rigged equipment require that the load be picked up or deposited in a location which is not visible to the operator. An example of this condition is the loading or unloading of a ship's hold, the pouring of crane-borne concrete in the heavy construction field or blind spotting into an excavation. Such blind spotting, as it is called, requires the services of one or more relay men who signal each other and/or the operator of the equipment, thus permitting the operator to correctly position the boom of the piece of equipment for picking up or depositing the load, even though he cannot actually see it. By the practice of the present invention, it is possible to eliminate this cumbersome and expensive relay signal method and its attendant risk of error, and to safely and accurately re-position the boom each time to provide fast and accurate pick-up or deposition of the load, once the operator has determined the proper boom angle by the use of the same boom spot indicator. In this manner, the work output of a piece of equipment is materially increased while, at the same time, the safety and efficiency of the operation is greatly improved.

Many operations in the construction and industrial fields involving boom rigged equipment entail great operator fatigue and discomfort because of the necessity, for instance, that the operator look into the sun or assume an unnatural or uncomfortable position in order to observe elevation of the boom and the positioning of the related load. With the aid of the present invention this becomes unnecessary and operator fatigue is greatly reduced, thereby increasing operator efficiency.

With the foregoing and other objects in view, I have devised the construction illustrated in the accompanying drawings forming a part of this specification. It is, however, to be understoood that this invention is not limted to the specfic details of construction and arrangement shown, but may embody various changes and modifications within the scope of the invention.

Figure 21:
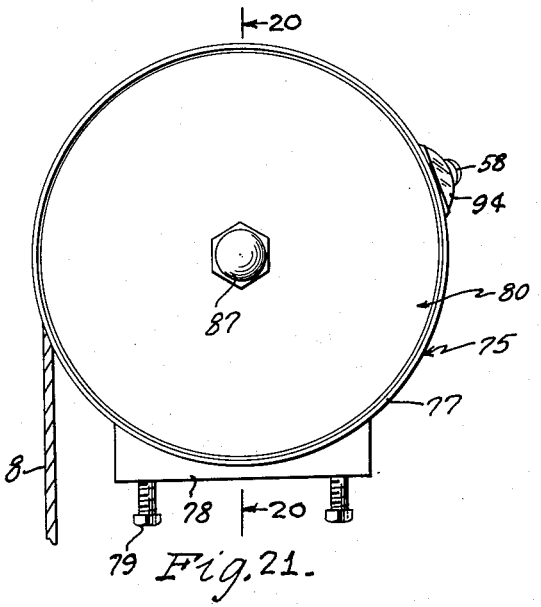
Figure 22:
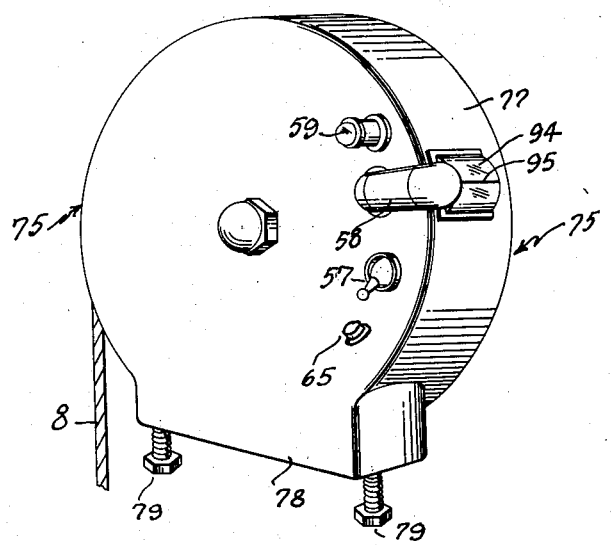
Figure 23:
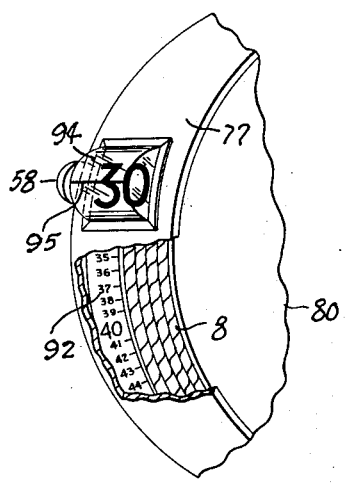
Figure 24:
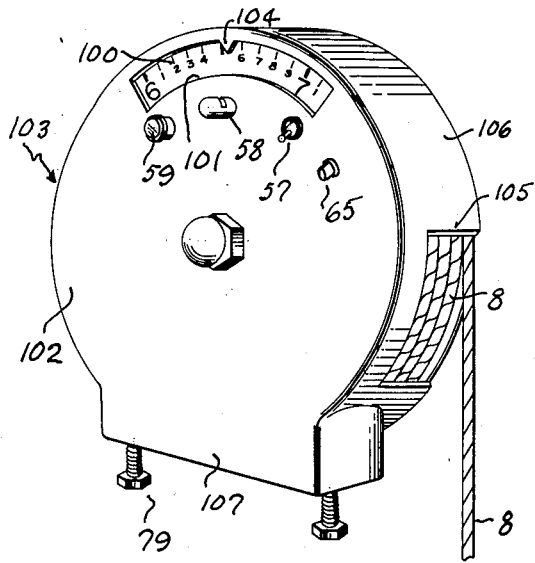
Figure 25:
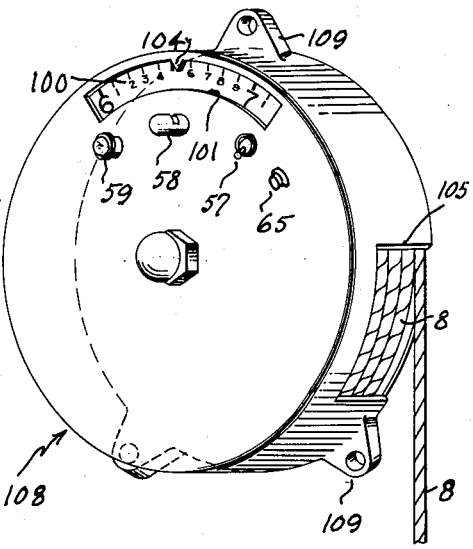
Figure 26:
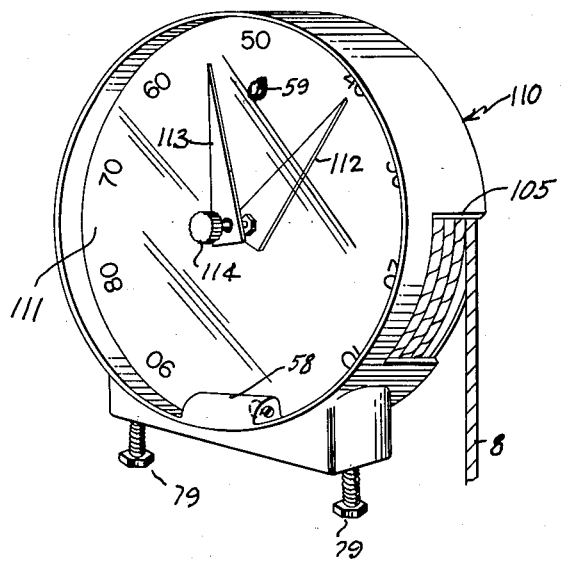

In these drawings:

FIG. 1 is a side view of the device;
FIG. 2 is a front view thereof, looking from the left of FIG. 1;
FIG. 3 is a similar view looking from the right of FIG. 1;
FIG. 4 is a partial vertical central section taken on the longitudinal central axis of the device;
FIG. 5 is an expoded view showing various parts used in the device;
FIG. 6 is a side elevation of the device, the opposite of the side view shown in FIG. 1;
FIG. 7 is a vertical section on a larger scale taken substantially on line 7—7 of FIG. 3;
FIG. 8 is a rear view showing a support bracket and this device mounted thereon;
FIG. 9 is a view of an electrical connector;
FIG. 10 is a rear view showing a mounting which may be used for the safety signal operating cams;
FIG. 11 is a plate which may be used as an optical mounting for the device;
FIG. 12 is a detail showing how the flexible cable may be secured to the winding drum;
FIG. 13 is a diagrammatic view showing how the device may be installed on a piece of boom rigged equipment;
FIG. 14 is an electrical diagram of the signal operating system;
FIGS. 15 to 19 are perspective views of the elements which may be used in the installation of the device in boom rigged equipment;
FIG. 20 is a vertical section of a modified construction taken substantially on line 20—20 of FIG. 21 but on a larger scale;
FIG. 21 is a side view looking from the left of FIG. 20 and on a reduced scale;
FIG. 22 is a perspective view looking toward the opposite side from FIG. 21;
FIG. 23 is a detail view of the form of FIGS. 20 to 22 with a part of the casing broken away;
FIG. 24 is a perspective view of another modification;
FIG. 25 is a perspective view of a further modification, and
FIG. 26 is a perspective view of still another modification.

The electrical elements of the device as shown comprise a simple signal circuit to warn the operator by means of a signal light when the boom reaches the predetermined maximum or minimum safe elevation. A horn, buzzer, or other audible signal may be used in connection with, or in place of, the visual signal. The signal circuit also includes a white light which may be used to indicate whether the signal or warning circuit is energized and in the operative condition. It also includes means whereby the danger signal device may be tested to determine whether it is operative. The white light above referred to also serves as a means for illuminating, during night operations, the indicator scale previously referred to.

Although an electrical switch signalling means is shown, a valve or other means may be used to actuate any desired combination of mechanical, hydraulic, or pneumatic signals or control equipment as the boom angle changes. The device of this invention also includes a means for visually indicating the angular relationship of the boom to a horizontal or other selected reference plane of such powered equipment as cranes, shovels, draglines, pile drivers, and so forth, said means consisting essentially of a flexible cable, one end of which is securely attached to the boom at a fixed predetermined distance outboard from the center of the boom leg pin. A guide sheave or pulley is attached to the structure or cab of the equipment at predetermined horizontal and vertical distances from the center of the boom leg pin, as described hereinafter, so that there is an appreciable change in the distance from the center of said sheave to the fixed point on the boom as the angle of elevation of the boom changes. Additional sheaves or pulleys may be attached inboard of the guide sheave above described in order to lead the flexible cable smoothly and without binding to the spool member of the boom spot indicator. The indicator includes a spool or drum on which several turns of the cable are wrapped for the purpose of causing rotation of the said spool or drum as the said boom changes position, a suitable scale marked with graduations corresponding to the angular positions of the said boom being attached to the said spool or drum so that it rotates with the said spool or drum, said scale divisions coming into register with an index pointer on the fixed housing of the boom spot indicator. Suitable means, such as a bracket or floor flanges and stanchion, are provided for mounting the boom spot indicator in a position which will insure that the scale and warning light will be readily visible to the operator of the equipment. The indicator also includes means such as, for example, a clock type spring for maintaining tension on the cable throughout its full cycle of rotation.

Referring to FIG. 13, the device is shown diagrammatically by way of example as applied to a piece of power-operated equipment, such as, for example, a crane, including a cab 1 mounted on an endless chain tread type of supporting base 2, and a boom 3 pivotally mounted on this base by the boom leg pin 4, the power drive and control means for this boom not being shown. The indicator comprises a unit 5 mounted in the cab 1, as, for example, on a suitable bracket 6 secured to one side wall of the cab where the indicating scale and safety signal are clearly visible to the operator of this equipment, and in the arrangement shown this indicator unit being connected to the boom at a suitable location 7, spaced a predetermined distance from the boom leg pin 4, by means of a flexible cable 8 running over suitably located guide pulleys or sheaves 9 and 10.

The indicator unit comprises two end or closure members 11 and 12 between which is a rotatable member or reel 13. The member 11 comprises an upright end wall 14 and a circular peripheral flange 15 so that the member is open on the inner side to receive a portion of the rotatable reel 13. It has a straight base 16 by which it may be secured to a mounting means such as the supporting bracket 6 by any suitable means, as, for example, the screws 17. Member 13 may have radial strengthening ribs 13a.

The end member 12 is of a similar construction to member 11, including an upright end wall 18 and an inwardly extending peripheral flange 19. It also has a straight base 20 by which it may be secured to the bracket 6 by screws 21 similar to the screws 17. As shown in FIGS. 2, 3 and 4, this member is located on the opposite side of the reel 13 from the member 11.

The member 13 is mounted to rotate within the member 11 on a stationary shaft 22 secured to the end wall 14 at the inner side thereof by means of a reduced end portion 23 and a cap nut 24, which may be locked in position by a set screw 25, the member 13 being mounted on this shaft by a sleeve bearing 26 between the wall 14 and the thrust bearing 27, and it is secured on the shaft by a cap nut 28 threaded on the reduced end 29 of the shaft. This member 13 includes a laterally extending circular flange 30 forming a drum on which may be wound a flexible steel cable 8. The member 13 also includes a circular flange 31 within the flange 30 enclosing a clock type of flat spiral spring 32 secured at one end by any suitable means, as indicated at 33, FIG. 1, to the flange 31, and at its opposite end 34 to an anchor sleeve 35 secured to the shaft 22. This spring tends to rotate member 13 to wind the cable on the drum 30 and maintain a tension on the cable to keep it taut during operation of the device.

The flange 15 of the member 11 is provided with an opening 36 (FIG. 3) on one side of the device through which the cable 8 may be led from the drum 30 to the guide pulley 10 and over the pulley 9 where it is connected at its free end to the boom 3 at 7. Any suitable means may be provided for connecting this cable to the boom, as, for example, an eye-bolt 37, as shown in FIG. 16, and a snap hook 38, as shown in FIG. 15.

The inner free end of the cable 8 is secured in the rotatable member 13 by any suitable means, as, for example, an anchoring sleeve 39 (FIG. 12) which receives the end of the cable and is silver-soldered to it after the end of the cable 8 is passed through a hole 13b in the circular flange 30 of member 13.

The rotatable member 13 carries on its outer periphery a circular band 40 which is calibrated, as indicated at 41, to form an indicating scale movable with the member 13, past a stationary index pointer or bench mark 42 on the member 11, as indicated in FIG. 2. This, of course, will indicate the position of the member 13 under action of the cable 8 and will indicate the relative inclination or angle of the boom 3 with respect to the horizontal. The calibration 41 is arranged in a reverse order, calibrated to the predetermined attachment point, so that as the member 13 is rotated from the position of FIG. 2 for maximum elevation of the boom, unwinding of the cable from the drum 30 as the inclination of the boom decreases will shift the scale 40 to indicate a lower number, less than the maximum, to correspond with the reduced angle of inclination of the boom.

The rotatable member 13 also includes a boss 43 (FIGS. 4, 7 and 10) on which is mounted a cam or cams 44 for operating a signal means for indicating when the boom 3 has reached the maximum or minimum inclination or angle to the horizontal which is considered safe. This cam is mounted on a supporting plate 45 mounted on the boss 43 by hexagonal posts 46 having reduced threaded ends 47 by which they are threaded into the boss 43, and the plate 45 is secured on the ends of these posts by suitable screws 48. The cam 44 preferably comprises two superimposed plates 49 and 50, substantially triangular in shape, as shown in FIG. 7, and pivoted at their apexes to the plate 45, as indicated at 51, for adjustment to different angles about the axis of rotation of the member 13. For this purpose the plates may each be provided with an arcuate slot 52 through which may extend a clamping screw 53 threaded into any one of a series of tapped openings 54 in the plate 45 arranged on the arc of a circle having as its center the center 51 of plate 45.

This cam operates a signal or alarm to indicate when the boom of the equipment is raised or lowered to a predetermined maximum or minimum safe elevation in the operation of the equipment. This signal or alarm feature may take various forms such as electrical, mechanical, pneumatic or hydraulic, but that shown comprises an electrical device including an electrical switch, such as a micro-switch 55, mounted on the inner side of the end member 12 and connected by suitable leads to a cut-out switch 56, perferably in the form of a toggle switch, operably by a lever 57 on the outside of the member 12. A white light 58 is provided to indicate when the signal or warning circuit is energized comprising a light bulb 58a in a casing 58b and illuminates the scale 41 through an opening 58c in the casing, and a warning signal, in the present case in the form of a red light 59. The switch 55 is operated by a control lever 60 pivotally mounted in the member 12 at 61, and one arm 62 of which lever is arranged to operate the switch 55, while associated with the other arm 63 is a testing means, comprising a reciprocable plunger rod 64, operable by a push button 65 at the outer side of the member 12 and normally held in a retracted position by a coil spring 66, this rod being mounted in a suitable support 67. These devices are electrically connected by suitable leads 68 and connectors 69 to any suitable electric current supply, as, for example, a battery or other supply system, and, if the battery system, connectors 69 could be of the automotive type, the leads being connected to them by the female elements 70 connected to the leads and inserted in the connectors 69. These connections could be covered by protective tubes 71.

In operation, the flexible steel cable is connected to the boom 3 of the power-driven equipment at the point 7, as previously indicated.

Referring to FIG. 13, dimension A is the distance from the center of the boom leg pin to point 7, measured along the longitudinal axis of the boom; dimension B is the vertical distance from the center of the boom leg pin to the top center of guide pulley 9; and dimension C is the horizontal distance from the center of the boom leg pin to the center of guide pulley 9. Scale 41 is non-linear, due to the fact that, because the locus of point 7 (FIG. 13) is the arc of a circle of radius A, the rate per degree change in boom elevation at which cable 8 is withdrawn from drum 30 varies as the boom moves from the vertical towards the horizontal.

The length of scale 41 and the relative positions of the graduations therein are governed by the values of dimensions A, B and C (FIG. 13) and the diameter of drum 30. By way of example, scale 41 as shown is designed to completely encircle the outer periphery of rotatable member 13 and is graduated from 15° to 95°. The diameter of rotatable member 13 is such that when cable 8 is so installed that the value of dimensions A, B and C is each eighteen inches, member 13 will rotate 360° when the boom is raised from a position 15° above the horizontal to a position 5° past the vertical (95°). With the scale so laid out any deviation from the eighteen-inch distances of dimensions A, B and C, or any of them, would cause inaccuracies in the indication on the scale. However, such inaccuracies in certain instances may be unimportant in service, since the operator of the equipment is primarily interested in the repeatability of the indication. That is, for any given reading of the boom spot indicator scale, the elevation of the boom, or its angle of inclination with respect to the horizontal, should be the same at all times. The present invention provides absolute repeatability of indication. If, in any case, installation conditions should necessitate any deviation from the eighteen-inch distance of dimensions A, B and C, or any of them, and if extreme accuracy of indication should be required nevertheless, it would be a simple matter to replace scale 41 with a special scale, constructed to compensate for any required deviations from the eighteen-inch distance referred to. In the arrangement shown, the greater the angle of the inclination of the boom to the horizontal, the smaller will be the turning of the scale 41 by the flexible cable, and conversely the movement of the boom toward the horizontal position will draw a greater amount of cable from the drum and rotate the scale a greater amount. The calibration of the scale is reversed so that the larger figure is indicated by the index pointer 42 when the boom is in its highest position, or greatest angle of inclination to the horizontal, and its lowest figure is indicated when it is in its lowest position, or its smallest angle to the horizontal. The cam 44 using either or both plates 49 and 50, which rotate with the reel 13 and scale 41, may be adjusted to engage the arm 62 of the lever 60 to operate the microswitch 55 and actuate the danger signal 59 when the boom enters either the high or low angle danger zone.

The operator at any time may, by pushing inwardly on the plunger 65, operate the microswitch 55 to test whether this danger signal 59 is operating properly. The positions of the two members 49 and 50 of the cam 44 may be adjusted or changed so that the said switch or other signal-operating means will be actuated when the boom is raised or lowered to the maximum or minimum angle determined to be safe for the equipment involved.

For certain installations, instead of mounting the device on the bracket 6, it may be mounted on a suitable plate 72 indicated in FIGS. 6 and 11. It may also be mounted on a floor stanchion and pipe support if desired.

The wall 18 of member 12 may have an opening covered by a closure plate 73 and held by screws 74 to give access to the interior of member 12 and cam 44 for adjustment of this cam.

Modified constructions of this device are possible, as shown in FIGS. 20 to 26. That is, instead of making the device in three sections, as shown in FIGS. 2, 3 and 4, it may be made in two sections as shown in these figures. The construction as shown in FIGS. 20 to 23, comprises a housing 75 including a side wall 76 and a peripheral laterally extending wall or flange 77 having a base 78 by means of which the device may be mounted on any suitable support, such, for example, as the bracket 6 of FIGS. 7 and 8, or the plate 72 of FIGS. 6 and 11, and secured thereto by any suitable means, such, for example, as the screws 79. Mounted in this housing is a rotatable reel 80 including a drum 81 carried by the side wall 82, this side wall closing the open side of the housing 75. The flexible cable 8 is connected to this drum and may be wound thereon the same as described in the first form, its free end being secured to the drum and passing out of the housing through an opening in the side wall 77. Reel 80 is mounted to rotate in the housing 75 by means of a shaft 83 mounted in a bronze bearing 84, and secured for rotation therein by a cap nut 85. The shaft has a reduced portion 86 on which the reel is mounted and secured by the cap nut 87, the reel thus rotating with the shaft. A coil spring 88 similar to the spring 32 of the first form is anchored at its inner end 89 to the shaft and at its outer end to an enclosing retainer 90 secured at 91 on a support 92 secured to the housing. This spring thus tends to rotate the wheel in a direction to wind the flexible cable 8 thereon, the same as the action in the first form. A calibrated scale 93 is carried on the periphery of the wheel and is visible through a magnifying viewing lens 94 over an opening in the flange 77 of the housing, and which lens has an index line 95 for cooperation with the scale to indicate the position of the reel and the angle of inclination of the boom 3, as previously described in connection with the first form. The same warning system is used with this device as in the first form, and is mounted within the housing 75. Although it is not shown in detail, the cam control microswitch is indicated diagrammatically at 96, and has the same cam controls as in the first form, one set of these cams being indicated at 97 corresponding to the cams 44 of the first form mounted on the supporting plate 98 secured to the reel to rotate therewith by the posts 99. There could be two sets of these adjustable cams, one for the high angle and one for the low angle of the boom 3, or either set can be adjusted to operate at both the high and the low angle. The second set is not shown in the drawing. The same warning signal 59, the white light and scale-illuminating light 58, the on-and-off toggle switch 57, and the testing means 65, is used in this form of device as in the first form of FIGS. 1 to 7.

A slightly different modification is shown in FIG. 24. However, the only change is that the scale 100 is on the side of the reel and visible through a curved opening 101 in the side wall 102 of the housing 103, and cooperates with an index pointer 104 to indicate the angular position of the reel and therefore the angular position of the boom 3 as in the first form. The cable 8 from the reel passes through an opening 105 in the peripheral wall 106 of the housing, which is provided with a base 107 for mounting the device on a suitable support. The same warning light 59, scale-illuminating light 58, toggle switch 57, and testing means 65 is used as in the other forms.

The device of FIG. 25 is the same as that of FIG. 24 except that the housing 108, instead of having the base 107 for mounting on a support, is provided with laterally extending lugs or ears 109 whereby the device may be mounted on an upright wall by means of suitable screws or bolts passing through the openings in these lugs.

In the form of FIG. 26, instead of having the indicating scale mounted on the rotatable reel, it is stationary in the housing 110 as indicated at 111, and then a pointer 112 is provided rotating with the reel and located over the face of this scale for cooperation therewith. A reference pointer 113 is provided which may be set in any desired angular position by the hand grip 114. The same warning light 59 and scale-illuminating light 58, together with the same toggle switch and testing means, may be used as in the other forms, the toggle switch and testing means not being shown as they are located on the invisible side of the housing. This device operates to indicate the angular position of the boom 3, the same as the other forms.

It will be seen from the above that the device is of a simple construction, which will therefore be capable of operation for a long period with little danger of its becoming disabled or inoperative; that it may be assembled and mounted as a unit in the cab of the power-operated equipment in the most effective position for ready observation by the operator of the equipment, to indicate at all times the relative inclination of the boom to the horizontal, and to instantly give a warning signal should the boom be raised or lowered to its high or low angle safety limits.

Having thus set forth the nature of my invention, I claim:

1. A boom spot indicator comprising a pair of laterally spaced end members each including an end wall and a laterally extending peripheral flange, the end walls being substantially parallel, with the flanges extending toward and spaced from each other, a shaft mounted on and extending inwardly from one of said end walls, a rotary member mounted on the shaft including an outer wall disposed between the flanges of the end members and a drum at the inner side of and closely adjacent the flange of one of said members, a flexible cable passing through an opening in the latter flange and secured to and partially wound on the drum between the drum and the enclosing flange, means for securing the free end of the cable in a fixed position to the boom of a piece of boom rigged equipment at a fixed distance from the boom leg pin, a spring connected to the drum tending to turn it in a direction to wind the cable thereon and keep it taut, a stationary indicator on one of the end members, a scale on the outer wall of said rotary member between the flanges movable past said indicator on turning movements of the rotary member to indicate angular positions of the boom, an electric danger signal mounted in the other of the end members, a switch controlling operation of said signal mounted in said other end member, means mounted on the rotary member for operating said switch at a predetermined angular position of the rotary member which corresponds to a predetermined angular position of the boom comprising a plate provided with a cam surface in position to operate said switch, and means mounting the cam plate for selective angular adjustment on the rotary member to operate the switch at different predetermined angular positions of the rotary member comprising an arcuate slot in said cam plate, a plurality of spaced arcuately disposed holes in the rotary member and locking means selectively receivable in said slot and one of said holes for selectively locking said cam plate in adjusted position.

2. The boom spot indicator of claim 1 in which the means for operating the switch comprises two cam plates pivotally mounted side by side on the rotary member and each provided with a cam surface adapted to operate the switch, each cam plate being mounted for separate adjustment to different angular positions on the rotary member to operate the switch in different angular positions of said member, and means for securing the cam plates in different angular positions to which they may be adjusted.

References Cited in the file of this patent

UNITED STATES PATENTS

| 749,743 | McQuown | Jan. 19, 1904 |
| 773,861 | Ferris | Nov. 1, 1904 |
| 1,671,290 | Houston | May 29, 1928 |
| 1,682,421 | Rosenbaum | Aug. 28, 1928 |
| 1,750,962 | Lichtenberg | Mar. 18, 1930 |
| 1,773,589 | Lichtenberg | Aug. 19, 1930 |
| 1,795,405 | Nash | Mar. 10, 1931 |
| 1,857,172 | Wagner | May 10, 1932 |
| 2,374,298 | Nasset | Apr. 24, 1945 |
| 2,654,339 | Sperling | Oct. 6, 1953 |
| 2,733,511 | Staples et al. | Feb. 7, 1956 |

FOREIGN PATENTS

| 467,494 | Great Britain | June 14, 1937 |